United States Patent

Ditlinger

[11] 3,903,999
[45] Sept. 9, 1975

[54] EXTENSIBLE BRAKE ADJUSTER AND RESET APPARATUS

[75] Inventor: Richard J. Ditlinger, South Bend, Ind.

[73] Assignee: The Bendix Corporation, South Bend, Ind.

[22] Filed: Dec. 5, 1974

[21] Appl. No.: 529,762

[52] U.S. Cl. .............................. 188/196 R; 188/71.8
[51] Int. Cl.² ........................................... F16D 65/54
[58] Field of Search ........... 188/71.8, 196 C, 196 R, 188/196 P; 192/111 A

[56] References Cited
UNITED STATES PATENTS

| | | | |
|---|---|---|---|
| 3,376,959 | 4/1968 | Holcomb, Jr. et al. | 188/71.8 X |
| 3,403,755 | 10/1968 | Barrett et al. | 188/71.8 X |
| 3,844,388 | 10/1974 | Ditlinger et al. | 188/196 R |

*Primary Examiner*—George E. A. Halvosa
*Attorney, Agent, or Firm*—Gordon H. Chenez; William N. Antonis

[57] ABSTRACT

Automatic brake adjuster and reset apparatus particularly adapted for use in a multiple disc aircraft disc brake and provided with two-stage adjuster means wherein a deformable tube member provides a first range of adjusted brake positions and a permanently crushable annular member provides a second range of adjusted brake positions. The deformable tube member is concentric with a cylindrical casing which bears against the crushable member interposed between the cylindrical casing and a fixed housing. The casing is provided with first and second spaced apart stop portions which are engaged by the spring loaded deformable tube to define a predetermined brake running clearance.

11 Claims, 4 Drawing Figures

EXTENSIBLE BRAKE ADJUSTER AND RESET APPARATUS

BACKGROUND OF THE INVENTION

Automatic brake adjusting and reset devices for multiple disc aircraft disc brakes are well known and have taken various forms most of which perform satisfactorily in the brake environment for which they are intended. However, the demand for smaller volume, lighter weight, longer life between brake overhauls and/or higher capacity brakes has resulted in the need for so-called "extensible" brake applying pistons and automatic brake adjusting and reset devices. Reference is made to U.S. Pat. No. 3,789,738 to R. F. Horner for an example of an extensible brake applying piston and to U.S. Pat. No. 3,844,388 40 R. J. Ditlinger and P. Brooks for an extensible brake adjuster and reset device. The present invention is an improvement over the extensible brake adjuster and reset device of U.S. Pat. No. 3,844,388 in that it may be made more compact and structurally reliable.

SUMMARY OF THE INVENTION

The present invention provides a disc brake automatic adjuster and reset device of the deformable tube type wherein the range of adjustment provided by the tube may be increased significantly without increasing the operative length of the tube.

It is an object of the present invention to provide a compact and reliable automatic brake adjuster and reset device for a multiple disc brake and providing a large range of adjustment to compensate for bake wear.

It is another object of the present invention to provide a multiple disc brake adjuster and reset device which may be easily rebuilt for repeated use.

Other objects and advantages of the present invention will be apparent from the following description and accompanying drawings.

DESCRIPTION OF THE PREFERRED EMBODIMENT

Figure 1:
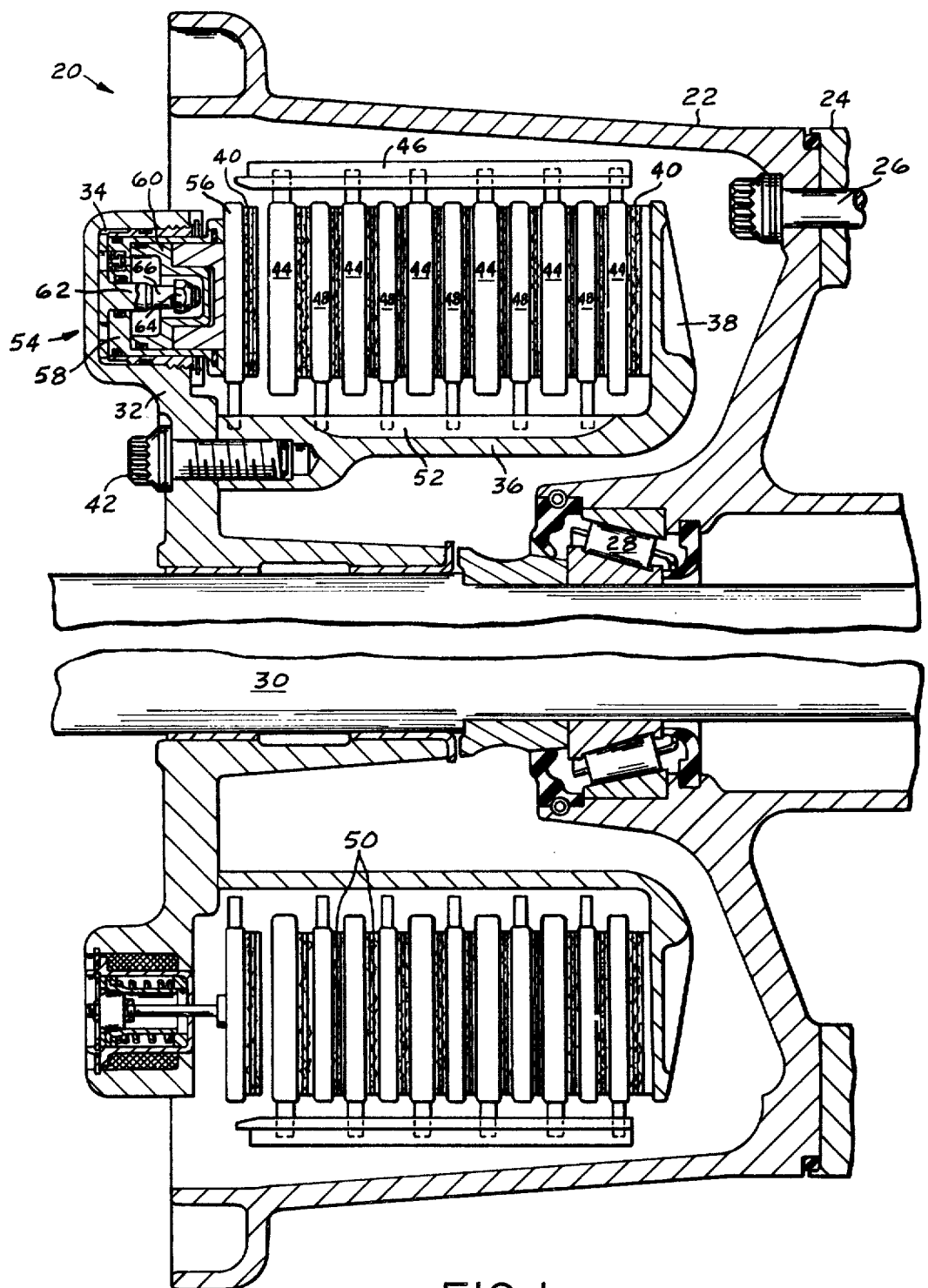
FIG. 1 is a schematic representation of an aircraft wheel and brake embodying the present invention.

Referring to the drawings and, in particular FIG. 1, numeral 20 designates an aircraft wheel and multiple-disc disc brake therefor. The wheel and brake is conventional and includes two annular wheel sections 22 and 24, only one of which is shown in entire cross sectional form, fastened together by circumferentially spaced apart bolts and nuts generally indicated by 26. The wheel 20 is suitably journaled by bearing means including roller bearing 28 on a rotatably fixed axle 30 which, in turn, is fixedly secured to conventional landing gear or strut structure, not shown. An annular brake carrier 32 suitably keyed to axle 30 is provided with a plurality of circumferentially spaced apart cavities 34, only one of which is shown, vented to a source of pressurized fluid, not shown, controlled by the aircraft operator. A torque tube 36 having an integral backing plate suitably sutably lined with friction material 40 is fixedly secured to carrier 32 by a plurality of circumferentially spaced apart bolts 42 only one of which is shown. A plurality of spaced apart rotatable annular brake rotor members 44 suitably attached to a key or retaining member 46 are adapted to slide therein axially relative wheel section 22. A plurality of non-rotatable annular brake stator members 48 which alternate with rotor members 44 are provided with friction lining 50 secured to opposite faces thereof and are suitably keyed for axial movement on torque tube 36 as at 52.

The cavities 34 are each provided with piston means generally indicated by 54 which, upon brake application, are simultaneously pressurized by the fluid in cavities 34 thereby displacing a pressure plate 56 against which the piston means 54 bear towards the backing plate 38 to urge the rotor members 44 and stator members 48 into frictional engagement thereby retarding rotation of wheel 20. The pressure plate 56, like backing plate 38 is lined with friction material 40.

It will be understood that the piston means 54 is necessarily confined in a limited space and must have an axial travel sufficient to compensate for the accumulative axial wear of the friction linings 40 and 50 over a period of brake use. Reference is made to the above-mentioned U.S. Pat. No. 3,789,738 for a detailed disclosure of the structure and operation of the piston means 54. For the purpose of the present disclosure, it is sufficient to understand that the piston means 54 is made in two piston sections 58 and 60. The piston section 58 is slidably carried on a fixed post 62 having a stop 64 which is engaged by piston section 58 to limit the axial travel of the latter in response to pressurization of cavity 34. The piston section 60 is slidably carried by piston section 58 and pressurized by fluid passing between a reduced diameter section 66 of post 62 and piston section 58 when the latter engages stop 64 thereby pressurizing piston section 60 which moves axially relative to piston section 58. Thus, the available range of movement of piston means 54 is the travel of piston section 58 as limited by stop 64 plus the subsequent travel of piston section 60 depending upon the extent of wear of the friction linings. 40 and 50.

The axial movement of pressure plate 56 actuated by piston means 54 to compress the rotor and stator members 44 and 48 together is a direct indication oof the wear status of friction linings 40 and 50 and may be adjusted to compensate for such lining wear. To that end, the present invention comprising brake adjusting and reset apparatus is connected to the pressure plate 56 to progressively advance the same as wear occurs and retract the pressure plate a predetermined distance upon release of the piston means 54 to provide a predetermined running clearance when the brake is released. A plurality of automatic brake adjusting and reset devices generally indicated by 68 are arranged in axially extending circular cavities 70 in circumferentially spaced apart relationship in carrier 32. Each brake adjusting and reset device 68 includes a cylinder 72 closed at one end by a wall 74 having a central opening 76 therein. An annular flange 78 extends radially outwardly from the opposite end of cylinder 72 and is adapted to engage a fixed stop defined by a snap ring 79 removably secured to carrier 32. The cylinder 72 is coaxially positioned in cavity 70 and slidably extends through an end wall 80 of the latter. A tubular column 82 formed of crushable material such as alternate sheets of flat aluminum foil and corrugated aluminum foil bonded by a suitable adhesive which provides a honeycomb structure capable of positive energy absorption at a predetermined constant rate is interposed between flange 78 and end wall 80 thereby providing a predetermined resistance to axial movement of cylinder 72 relative to cavity 70 as will be described. Preferably, the energy absorbing crushable material is of the type sold under the U.S. trade name Tube-Core by the Hexcel Corp. and shown and described in readily available literature published thereby.

A deformable tubular member 84 disposed in cylinder 92 and coaxial therewith is provided with a radially outwardly extending annular flange 86 which bears against a washer 88 under the influence of a compression spring 90 interposed between flange 86 and an annular guide member 92 which, in turn, bears against end wall 80. The washer 88 bears against a retaining or snap ring 94 removably secured in a mating slot 96 in the inner wall of cylinder 72 thereby establishing a fixed stop which limits movement of tubular member 84 under the influence of spring 90. The opposite end of tubular member 84 is slidably received by annular guide member 92 and adapted to engage end wall 80 to thereby limit movement of tubular member 84 away from retaining ring 94 as will be described.

A rod 98 fixed to pressure plate 56 extends therefrom through opening 76 and axially through tubular member 84. A torus-shaped member or button 100 positioned on rod 98 and coaxial therewith is adjustably secured in position thereon by an annular nut or stop member 102 and a lock nut 104 bearing against opposite sides of button 100 and threadedly engaged with rod 98. It will be understood that the button 100 is adapted to be pulled axially through tubular member 84 by rod 98 and, being of slightly larger diameter than the inner wall of tubular member 84, deforms the tubular member 84 radially outwardly thereby permitting the button 100 to progressively advance therethrough accordingly as will be described. Upon retraction of pressure plate 56, the button 100 is held fast to tubular member 84 which forcefully grips the button 100.

In operation, the pressure plate 56 is urged toward rotor and stator members 44 and 48 by piston means 54 upon pressurization of the latter thereby compressing the rotor and stator members 44 and 48 together resulting in frictional engagement thereof. The rods 98 being fixed to pressure plate 56 move accordingly thereby axially displacing buttons 100 secured thereto as well as tubular members 84 which grip the buttons 100. Assuming the friction linings 48 and 50 are worn to the extent that adjustment of the pressure plate 56 is in order to establish full engagement of the rotor and stator members 44 and 48, the tubular members 84 will be displaced against the resistance of springs 90 to the extent that tubular members 84 engage respective end walls 74 whereupon continued movement of pressure plate 56 and thus rods 98 causes the buttons 100 to advance axially relative to the respective tubular members 84 which are deformed radially outwardly accordingly until the pressure plate 56 has fully compressed the rotor and stator members 44 and 48 together against the backing plate 38. Upon release of the pressure plate 56 by depressurization of piston means 54, the pressure plate 56 is retracted under the influence of compression springs 90 which urge the tubular members 84 away from end walls 74 to the extent permitted by washers 88 which bear against snap rings 94 thereby establishing a predetermined running clearance or brake reset of rotor and stator members 44 and 48. The buttons 100 are progressively urged axially through tubular members 84 in the above-mentioned manner to automatically compensate for the total cumulative wear of friction linings 40 and 50 until the stop members 102 move into engagement with the respective end walls 74 which prevent further advancement of buttons 100 relative to the respective tubular members 84. Assuming that the stop members 102 have engaged end walls 74 and the pressure plate 56 is held in its retracted position by springs 90, a subsequent brake application results in movement of pressure plate 56 and thus tubular members 84 away from associated snap rings 94 and into engagement with end wall 74 in the heretofore mentioned manner. Continued movement of pressure plate 56 results in loading of cylinder 72 which, in turn causes crushing of the tubular column 82 thereby permitting the cylinder 72 to advance accordingly relative to the carrier 32 to the extent required to attain full engagement of rotor and stator members 44 and 48. Upon depressurization of the piston means 54 and release of pressure plate 56, the latter is retracted in the same manner as heretofore described, i.e., the compression springs 90 urge tubular members 84 away from end walls 74 and into engagement with washers 88 bearing against snap rings 94, thereby establishing the desired brake reset.

Figure 2:
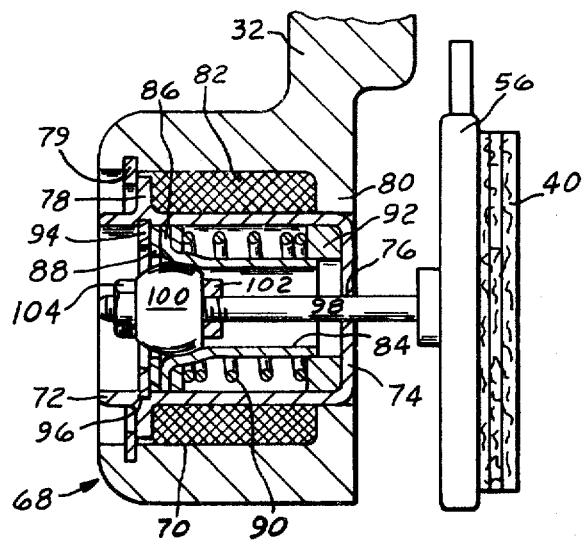
FIG. 2 represents a schematic view in cross section of the present invention shown in enlarged form and removed from the wheel and brake structure of FIG. 1.
Figure 3:
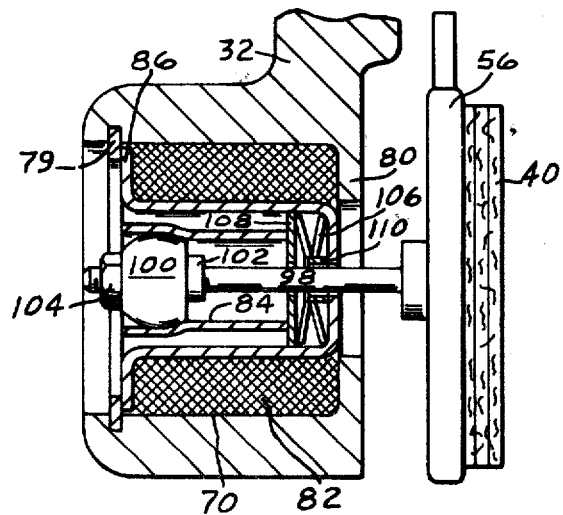
FIG. 3 represents a schematic view of a second embodiment of the present invention.

Referring to FIG. 3, a second embodiment of the present invention is shown wherein structure substantially identical to that of FIGS. 1 and 2 is identified by like numerals. In FIG. 3, the retracting force for the pressure plate 56 is derived from a plurality of washer-shaped spring elements 106 rather than a coil spring as in FIG. 2 which results in a more compact brake adjuster and reset device. To that end, one or more conventional washer-shaped spring elements 106 are interposed between end wall 74 and a washer-shaped member 108 slidably carried in cylinder 72 and through which rod 98 slidably extends. The tubular member 84 bears against member 108 and is urged away from end wall 74 by the spring elements 106 to the extent of axial extension of the latter. A tubular stop member 110 through which rod 98 slidably extends is interposed between end wall 74 and member 108 which stop member 110, upon compression of spring elements 106, is engaged by member 108 thereby limiting axial movement of tubular member 84 toward end wall 74 and providing the above-mentioned brake reset or running clearance following release of the pressure plate.

The operation of the embodiment of FIG. 3 is identical to that of FIG. 2 with respect to the deformable tubular member 84 and tubular column 82.

Figure 4:
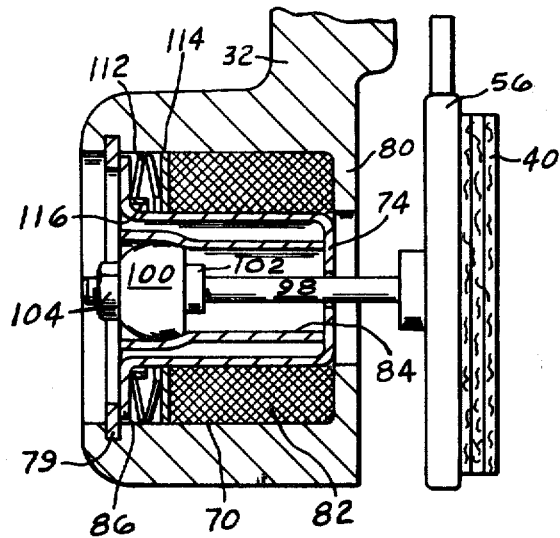
FIG. 4 represents a schematic view of a third embodiment of the present invention.

Referring to FIG. 4, a third embodiment of the present invention is shown wherein structure substantially identical to that of FIGS. 1 and 2 is identified by like numerals. FIG. 4 is similar to FIG. 3 except for a rearrangement of the washer-shaped spring elements and tubular stop member 110. In FIG. 4, it will be noted that the deformable tubular member 84 extends into engagement with end wall 74. The brake reset or running clearance is established by one or more washer-shaped spring elements 112 interposed between flange 72 and a washer-shaped member 114 bearing against the tubular column 82. An annular or tubular stop member 116 interposed between flange 78 and member 114 limits axial movement of flange 78 toward tubular column 82 upon compression of spring elements 112 and provides a predetermined axial retraction of cylinder in response to expansion of spring elements 112 upon release of the pressure plate 56 thereby establishing the above-mentioned brake reset or running clearance.

The sequence of deforming tubular member 84 and crushing tubular column 82 is not critical since the net result is the same. The tubular column 82 may crush before or after deformation of tubular member 84 or crushing and deformation may alternate between the two members 82 and 84 with no undesirable effect on the operation of the adjuster and reset device 68.

I claim:

1. Automatic brake adjusting apparatus for a disc brake having an axially movable fluid pressure actuated pressure plate for applying the brake comprising:
    an annular housing provided with a plurality of circumferentially spaced apart cavities;
    a radially deformable annular member disposed in each of said cavities;
    an axially deformable annular member disposed in each of said cavities and bearing against fixed stop means at one end thereof and in concentric relation to said radially deformable member;
    means including a button member fixedly secured to said pressure plate and engageable with said radially deformable member for deforming the latter in response to movement of said pressure plate in a brake applying direction; and
    means operatively connecting said radially deformable member and said axially deformable member for deforming said axially deformable member in response to movement of said radially deformable member.

2. Automatic brake adjusting apparatus as claimed in claim 1 wherein:
    said means connecting said radially deformable member and said axially deformable member includes a cylinder concentric with said radially deformable member and provided with first and second axially spaced apart stop portions adapted to be engaged by said radially deformable member to limit the axial displacement thereof relative to said cylinder; and
    resilient means operatively connected to said radially deformable member for urging the same into engagement with said frist stop.

3. Automatic brake adjusting apparatus as claimed in claim 2 wherein:
    said radially deformable member is provided with a radially outwardly extending flange at one end thereof;
    said resilient means is a coil spring concentric with said cylinder and said radially deformable member and bearing against said radially outwardly extending flange.

4. Automatic brake adjusting apparatus as claimed in claim 1 wherein:
    said means operatively connecting said radially and axially deformable members includes cylinder means disposed in each of said cavities and concentric with said radially and axially deformable members;
    first flange means extending radially outwardly from said cylinder means and bearing against one end of said axially deformable member;
    second flange means extending radially inwardly from said cylinder;
    resilient means interposed between said second flange means and said radially deformable member for urging the latter away from said second flange means.

5. Automatic brake adjusting apparatus as claimed in claim 4 wherein:
    said cylinder means is provided with further stop means having an axial spaced apart relationship with said second flange means;
    said resilient means urging said radially deformable member into engagement with said further stop means.

6. Automatic brake adjusting apparatus as claimed in claim 4 wherein:
    said cavities are each provided with an end wall having a central opening therein;
    said cylinder means slidably engageed with said end wall for axial movement through said opening.

7. Automatic brake adjusting apparatus as claimed in claim 1 wherein:
    said means operatively connecting said radially and axially deformable members includes cylinder means disposed in each of said cavities and concentric with said radially and axially deformable members;
    first flange means extending radially outwardly from said cylinder means;
    second flange means extending radially inwardly from said cylinder means;
    resilient means interposed between said first flange means and said axially deformable member for urging said cylinder means axially thereby holding said second flange means in engagement with said radially deformable member; and
    stop means interposed between said first flange means and said axially deformable member and engageable with said axially deformable member upon movement of said cylinder means to a predetermined extent against the resistance of said resilient means in response to a brake application.

8. Automatic brake adjusting apparatus as claimed in claim 1 wherein:
    said button member is connected to a rod coaxial with said radially deformable member and extending therefrom into fixed engagement with said pressure plate.

9. Automatic brake adjustment apparatus as claimed in claim 1 wherein:
    said button member is adjustably secured to one end of a rod member the opposite end of which is fixedly secured to said pressure plate.

10. Automatic brake adjusting apparatus as claimed in claim 1 wherein:
    said radially deformable annular member is deformed radially outwardly in response to movement of said button member axially therethrough; and
    said axially deformable annular member is crushed axially in response to axial movement of said radially deformable member.

11. Autoamtic brake adjusting apparatus as claimed in claim 1 wherein:

said means operatively connecting said radially and axially deformable members includes cylinder means disposed in each of said cavities and concentric with said radially and axially deformable members;

first flange means extending radially outwardly from said cylinder means;

second flange means extending radially inwardly from said cylinder means;

resilient means interposed between said second flange means and said radially deformable member for urging said radially deformable member axially away from said second flange means; and stop means interposed between said radially deformable member and said second flange means and engaged by said radially deformable member upon axial movement thereof to a predetermined extent against the resistance of said resilient means in response to a brake application.

* * * * *